(12) United States Patent
Kaneko et al.

(10) Patent No.: US 6,427,184 B1
(45) Date of Patent: Jul. 30, 2002

(54) DISK DRIVE WITH PREFETCH AND WRITEBACK ALGORITHM FOR SEQUENTIAL AND NEARLY SEQUENTIAL INPUT/OUTPUT STREAMS

(75) Inventors: Yuji Kaneko; Tomohiro Sakai; Takao Aigo, all of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/088,066

(22) Filed: Jun. 1, 1998

(30) Foreign Application Priority Data

Jun. 3, 1997 (JP) ............................................. 9-160477

(51) Int. Cl.[7] ............................................. G06F 12/00
(52) U.S. Cl. ............................. 711/4; 711/113; 711/213
(58) Field of Search .............................. 711/4, 213, 113

(56) References Cited

U.S. PATENT DOCUMENTS

| | | | |
|---|---|---|---|
| 5,640,597 A | * | 6/1997 | Noguchi et al. ............... 710/21 |
| 5,796,944 A | * | 8/1998 | Hill et al. ...................... 709/250 |
| 5,835,967 A | * | 11/1998 | McMahan ..................... 711/213 |
| 5,915,094 A | * | 6/1999 | Kouloheris et al. ......... 345/327 |
| 5,915,260 A | * | 6/1999 | Sokolov ....................... 711/113 |

FOREIGN PATENT DOCUMENTS

| | | | |
|---|---|---|---|
| JP | 62-8251 | * | 1/1987 |
| JP | 63-68957 | * | 3/1988 |
| JP | 64-12357 | * | 1/1989 |
| JP | 5-289818 | | 11/1993 |
| JP | 8-106365 | | 4/1996 |
| JP | 8-137754 | | 5/1996 |
| JP | 9-237224 | | 9/1997 |

* cited by examiner

Primary Examiner—Do Hyun Yoo
Assistant Examiner—Mehdi Namazi
(74) Attorney, Agent, or Firm—Whitham, Curtis & Christofferson, P.C.

(57) ABSTRACT

A magnetic disk processor according to the present invention includes an I/O stream monitor table and an I/O stream monitor which determines whether or not a start address of a certain I/O stream coincides with a sum of a last address of a past I/O stream stored in the I/O stream monitor table and 1 or whether or not the start address is within a range of last address of the past I/O stream plus α. With this construction of the magnetic disk processor, it becomes possible to detect sequential I/O streams issued from a plurality of independent applications and mixed on an I/O channel of a host computer.

13 Claims, 5 Drawing Sheets

DISK DRIVE WITH PREFETCH AND WRITEBACK ALGORITHM FOR SEQUENTIAL AND NEARLY SEQUENTIAL INPUT/OUTPUT STREAMS

BACKGROUND OF THE INVENTION

The present invention claims priority from Japanese Patent Application No. 9-160477 filed Jun. 3, 1997, which is incorporated herein by reference.

1. Field of the Invention

The present invention relates to a magnetic disk processor and, particularly, to a magnetic disk processor having a function of detecting a sequential I/O stream from a host computer.

2. Description of Related Art

In a case where a host computer accesses successive recording spaces sequentially, an input/output (I/O) stream which uses, as a start address, an address obtained by adding 1 to the last address assigned by previous input/output (I/O) operation is issued. A group of I/O streams is called sequential I/O streams.

In a conventional magnetic disk processing device, when a sequential read in which read commands are issued sequentially is detected, an over-head due to a positioning of a head of the magnetic disk processing device is shortened by prefetching a data which is larger than a range preliminarily instructed by a host computer from the magnetic disk device to a cache memory and, in response to subsequent read commands from the host computer, transferring the data from not the magnetic disk device but the cache memory.

In a write processing, an end report is performed to the host computer at a time when the data transferred from the host computer is stored in the cache memory (first write) and a write in the disk device which takes a long time is performed later (write back). In this case, when the sequential write in which write commands are issued sequentially is detected, the over-head due to the positioning of the head of the magnetic disk device is shortened by writing successive data stored in the cache memory in the magnetic disk device in the lump according to a plurality of write commands from the host computer.

Such conventional magnetic disk processing device is disclosed in Japanese Patent Application Laid-open Nos. Sho 64-12357, Sho 63-68957 and Sho 62-8251, etc.

Since, in the conventional techniques mentioned above, I/O streams issued by a plurality of independent applications operating on the host computer are mixed on the input/output (I/O) channel of the host computer, the I/O streams of the respective applications arrive at the magnetic disk device as random I/O streams even when the I/O streams are sequential I/O streams, so that the disk optimizing control such as prefetch and write back does not work effectively.

In a cluster system using a fiber channel transmission line which is recently standardized by ANSI (American National Standards Institute), a common use of data by a plurality of host computers is performed by sharing or commonly using a magnetic disk device by these host computers. In such system, however, sequential I/O command groups issued by the respective host computers are crossed each other and arrive at the magnetic disk device, so that the disk optimizing control does not work effectively.

Further, in a system handling a large amount of successive data such as a database, index data are stored in a secondary memory (i.e. storage device) to minimize unnecessary data access to thereby allow a high speed search processing. Therefore, a successive sequential data access becomes non-continuous data access as shown in FIG. 6. Such non-continuous I/O stream is called "near sequential I/O stream". Non-continuous portions are recognized as separate sequential I/O streams and, therefore, a large number of I/O stream monitor tables for recognizing the sequential I/O stream are required and so it is necessary to provide a large memory capacity for control.

SUMMARY OF THE INVENTION

An object of the present invention is to provide a magnetic disk processing device capable of detecting sequential I/O streams and near sequential I/O streams which are mixed on an input/output (I/O) channel of a host computer and issued by a plurality of applications.

According to a first aspect of the present invention, a magnetic disk processing device comprises an I/O stream monitor table for storing an information of I/O stream and I/O stream monitor means for searching/updating the I/O stream monitor table every I/O stream from a host computer and determining whether or not the I/O stream is a sequential I/O stream on the basis of whether or not a start address of a certain I/O stream coincides with (last address of a certain past I/O stream stored on the I/O stream monitor table)+1.

According to a second aspect of the present invention, a magnetic disk processing device comprises an I/O stream monitor table for storing entry key, address of a start of a stream, I/O stream size, read/write (RIW) type and prefetch size or write back size and I/O stream monitor means for searching a RIW type and an entry through the entry key which coincide with an RIW type and the start address assigned by an I/O stream from the I/O stream monitor table every time when the I/O stream from a host computer, respectively, arrives at the I/O stream monitor means table, newly adding to the I/O stream monitor table an entry composed of (entry key)=(start address)+(size), (stream start address)=(start address), (I/O stream size)=(size) and (R/W type)=(RIW type), when there is no coincident entry found, and updating, when there is coincident entry found, an entry key of the entry to (start address of I/O stream)+(size) to make (I/O stream size)=(I/O stream size)+(size) and determining it as a sequential I/O stream.

In the first and second aspects of the present invention, the magnetic disk processor may be provided with prefetch activator means for calculating a start address of prefetch on the basis of the stream start address and the prefetch size when the I/O stream monitor means detects a sequential read by hitting an entry by an I/O stream of a certain read type and a difference between the prefetch size and the I/O stream size becomes smaller than a preset threshold value as a result of an operation of the I/O stream monitor table, newly activates the prefetch of the preset size and updating the prefetch size.

Alternatively, the magnetic disk processor may be provided with write back activator means for calculating a start address of write back on the basis of the stream start address and the write back size when the I/O stream monitor means detects a sequential write by hitting an entry by an I/O stream of a certain write type and a difference between the I/O stream size and the write back size becomes larger than a preset threshold value as a result of an operation of the I/O stream monitor table, newly activates the write back of the preset size and updating the write back size.

According to a third aspect of the present invention, a magnetic disk processing device comprises an I/O monitor table for storing an information of I/O stream and I/O stream monitor means for searching and updating the I/O monitor table every time when an I/O stream arrives from a host computer at the I/O stream monitor means and determining whether or not the I/O stream is a sequential I/O stream on the basis of whether or not a start address of a certain I/O stream is within a range from a last address of past I/O streams stored in the I/O stream monitor table to (last address of the past I/O streams)+α.

According to a fourth aspect of the present invention, a magnetic disk processing device comprises an I/O stream monitor table for storing an entry key, stream start address, I/O stream size, R/W type and prefetch size or write back size and I/O stream monitor means for searching an entry having R/W type coincident with that assigned by an I/O stream and a start address of the I/O stream within a range from an entry key to "entry key+α" from the I/O stream monitor table every time when the I/O stream from a host computer arrives at the I/O stream monitor means, newly adding to the I/O stream monitor table an entry composed of entry key=start address+size, stream start address=start address, I/O stream size=size, and R/W type=R/W type when there is no coincident entry found, and updating, when there is coincident entry found, an entry key of the entry to I/O stream size=I/O stream size+size and determining it as a sequential I/O stream or a near sequential I/O stream.

In the third or fourth aspect of the present invention, a prefetch activator may be provided for updating the prefetch size by newly activating a prefetch of a size preliminarily set by calculating a prefetch start address on the basis of a stream start address and the prefetch size, when the I/O stream monitor means detects a sequential read or a near sequential read by an entry hitting a certain I/O stream of read type and a difference between prefetch size and an I/O stream size becomes smaller than a preset threshold value as a result of an operation of the I/O stream monitor table.

Alternatively, a write back activator may be provided for updating the write back size by newly activating a write back of a size preliminarily set by calculating a write back start address on the basis of a stream start address and the write back size, when the I/O stream monitor means detects a sequential write or a near sequential write by an entry hitting a certain I/O stream of read type and a difference between write back size and an I/O stream size becomes larger than a preset threshold value as a result of an operation of the I/O stream monitor table.

BRIEF DESCRIPTION OF THE DRAWINGS

The present invention will be described in detail with reference to the accompanying drawings, in which.

DETAILED DESCRIPTION OF PREFERRED EMBODIMENTS

Figure 1:
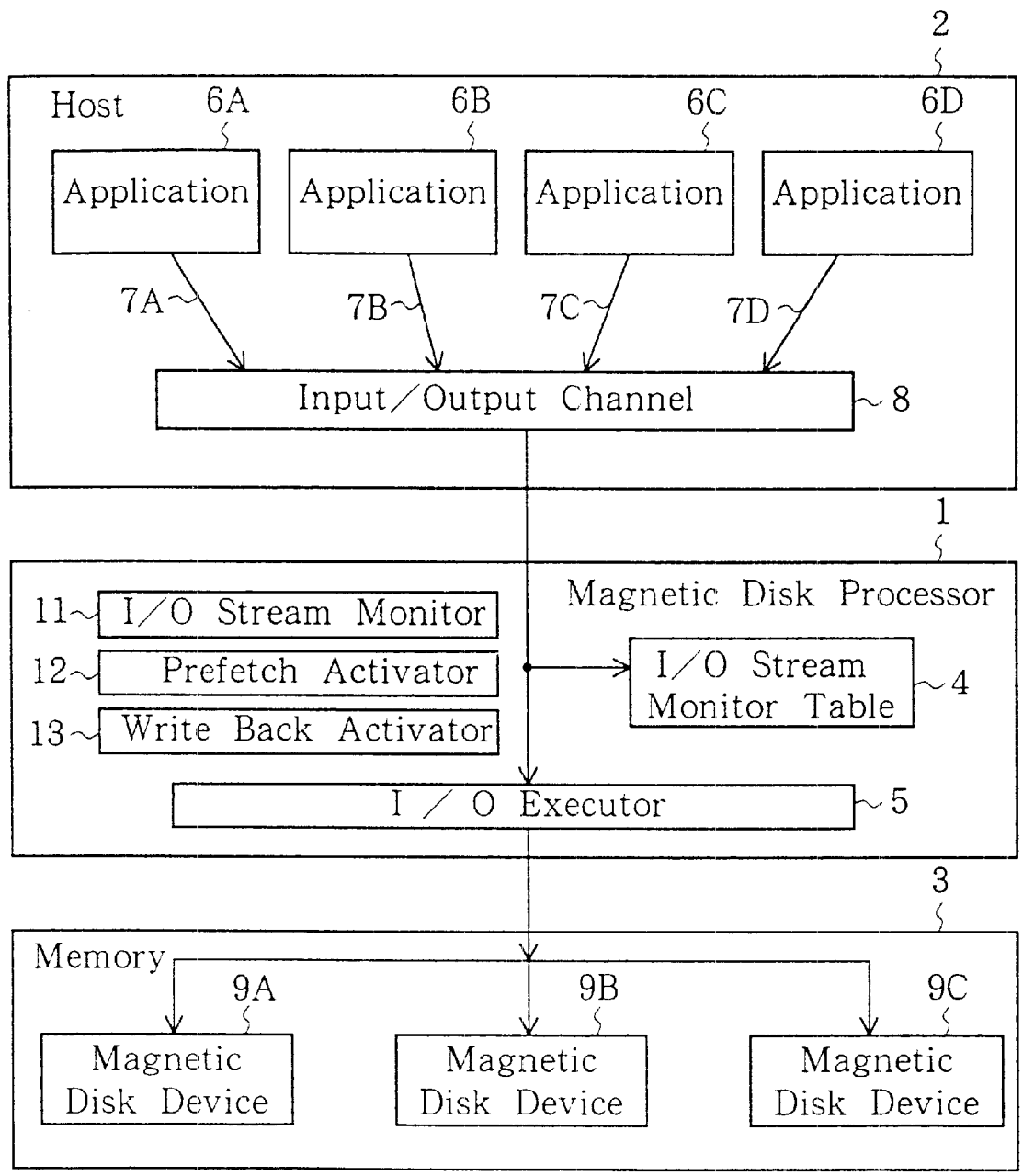
FIG. 1 is a block diagram showing a construction of a computer system including a magnetic disk processing device according to a first embodiment of the present invention.

FIG. 1 is a block diagram showing a construction of a computer system including a magnetic disk processing device according to a first embodiment of the present invention. The computer system is substantially constructed with a magnetic disk processing device 1 comprising an I/O stream monitor table 4, an I/O execution unit 5, an I/O stream monitor unit 11, a prefetch activator 12 and a write back activator 13, a host computer 2 having an input/output channel 8 and a memory 3 including a plurality of magnetic disks 9A, 9B and 9C.

I/O streams 7A~7D generated by independent application programs (referred to as merely"applications", hereinafter) 6A~6D operating in the host computer 2 are mixed in the input/output (I/O) channel 8 of the host computer 2 and transferred to the magnetic disk processing device 1. Incidentally, although, in this embodiment, the number of applications in the host computer 2 is 4, the number of applications is not limited to 4. "R/W type" indicative of kind of read (R) or write (W), "start address" indicative of a header address for read or write and "size" indicative of an amount of read or write data are assigned to each of the I/O streams 7A~7D. Data defined in " " indicate data noticed by the host computer 2 together with the I/O stream.

The I/O execution portion 5 instructs the memory 3 to perform a read or write from the magnetic disk devices 9A~9D depending upon a content of the I/O stream monitor table 4. Although the number of the magnetic disk devices is 3 in this embodiment, there is no limitation in the number of magnetic devices.

Figure 2:
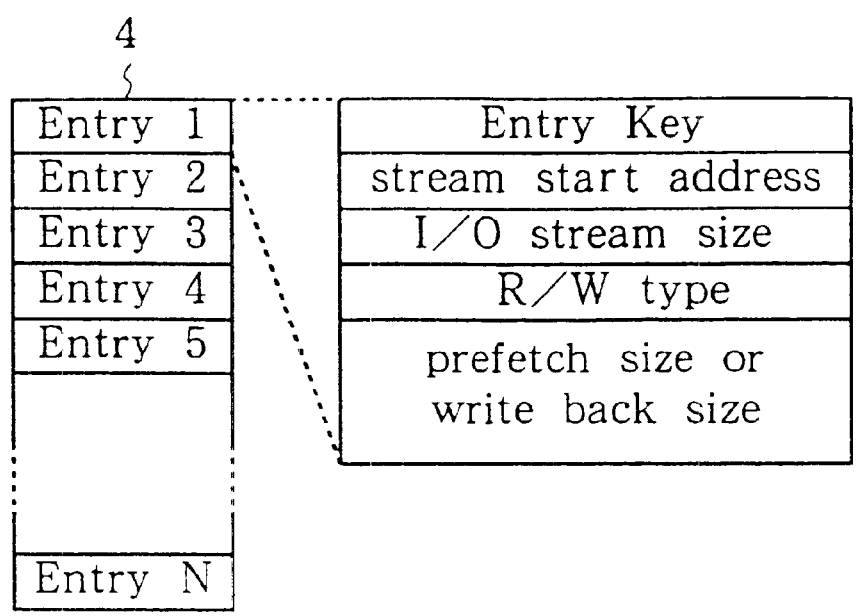
FIG. 2 is a flowchart showing a construction of an I/O stream monitor table shown in FIG. 1.

The I/O stream monitor table 4 having N entries is provided in the magnetic disk processing device 1, where N is an arbitrary integer. A construction of the I/O stream monitor table 4 is shown in FIG. 2. Each entry of the I/O stream monitor table 4 is constructed with [entry key], [stream start address], [I/O stream size], [R/W type] and [prefetch size or write back size]fields. Incidentally, the data put in brackets [ ] represent data in the I/O stream monitor table 4.

"Start address"+"size" is stored in the [entry key] field. A value thereof coincides with "start address" of an I/O stream which arrives later when the latter I/O stream is a sequential I/O stream. When an I/O stream which arrives later is a near sequential I/O stream, "start address" of the I/O stream exists-within an address range of a memory area of the memory, from [entry key] to [entry key]+α.

"Start address" of I/O stream is stored in the [I/O stream start address] field when an entry is newly added and this becomes a "start address" of the I/O stream.

"Size" of an I/O stream is stored in the [I/O stream size] field when an entry is newly added and, when a sequential I/O stream arrives thereafter, [I/O stream size]+"size" is stored as a new [I/O stream size] and, when a near sequential I/O stream arrives, the [I/O stream size]+(start address-entry key of that I/O stream)+"size" is stored as a new [I/O stream size]. This [I/O stream size] represents a read and write "size" of the whole I/O stream.

Figure 3:
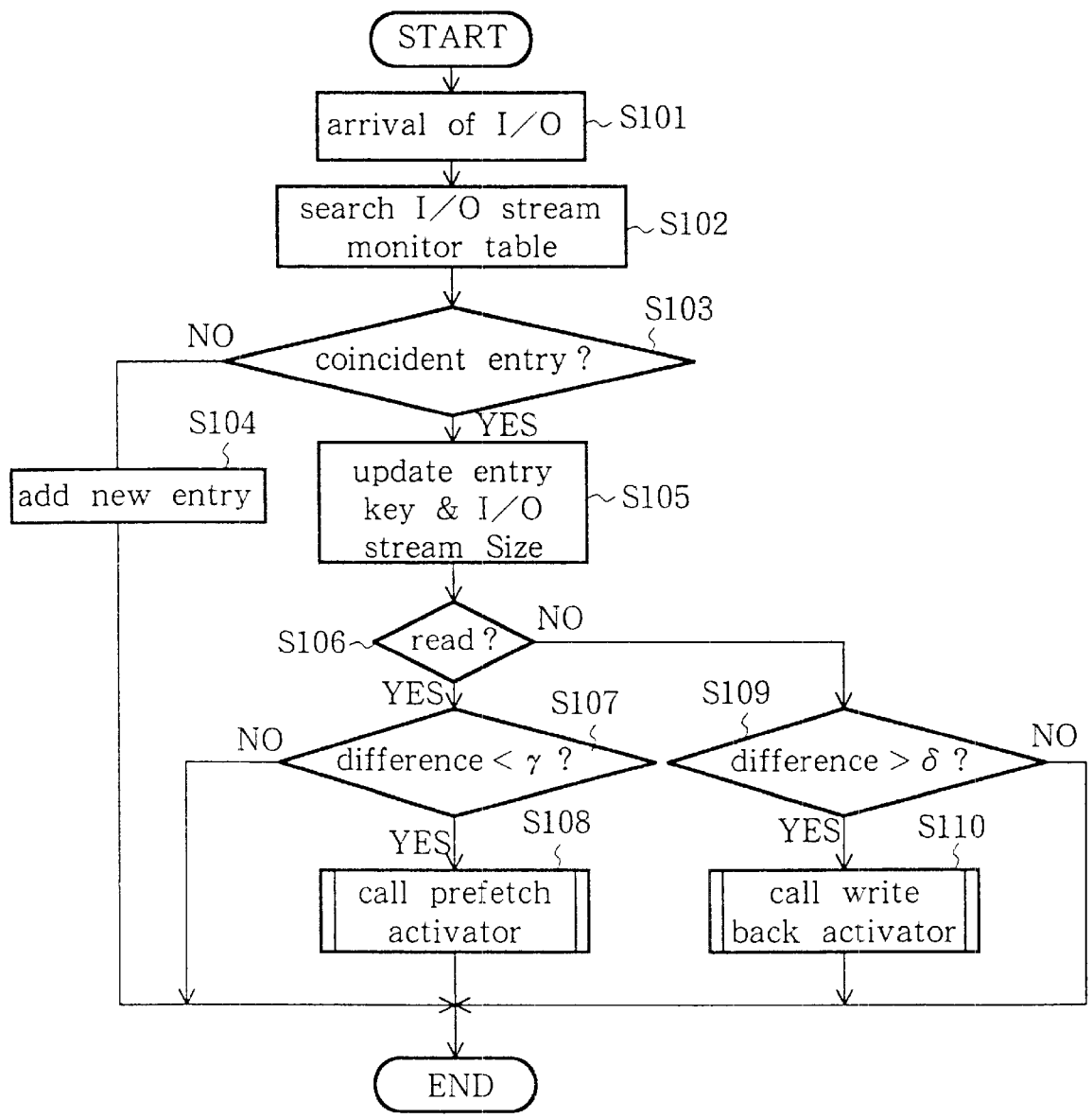
FIG. 3 is a flowchart showing an operation of an I/O stream monitor shown in FIG. 1.

Referring to FIG. 3, a processing performed by the I/O stream monitor 11 comprises an I/O stream arrival step S101, an I/O stream monitor table search step S102, a coincident entry determination step S103, a new entry adding step S104, an entry key and I/O stream update step S105, a read determination step S106, a difference determination step S107, a prefetch activator call step S108, a difference determination step S109 and a write back activator call step S110.

Figure 4:
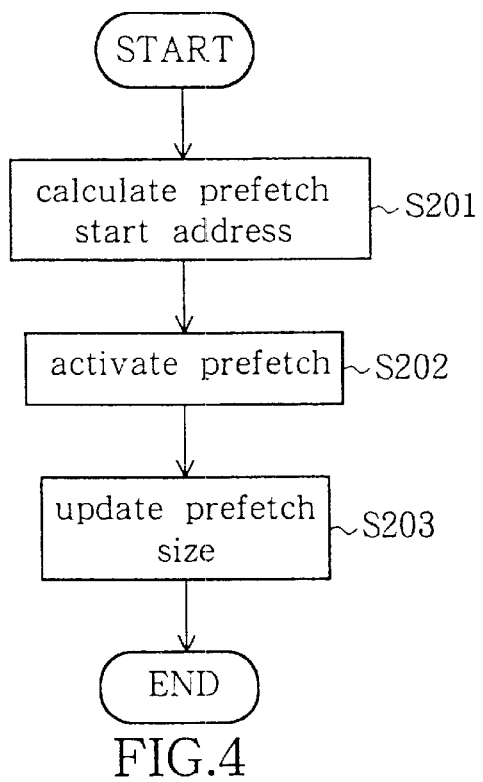
FIG. 4 is a flowchart showing an operation of a prefetch activator shown in FIG. 1.

Referring to FIG. 4, a processing performed by the prefetch activator 12 comprises a prefetch start address calculation step S201, a prefetch activation step S202 and a prefetch size update step S203.

Figure 5:
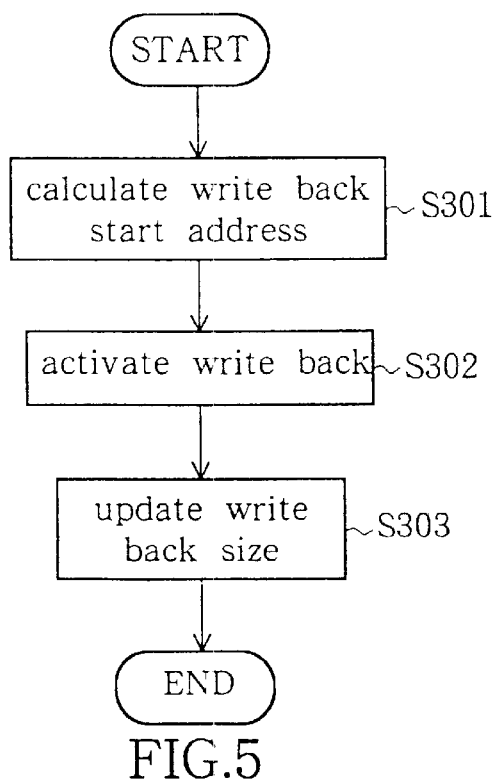
FIG. 5 is a flowchart showing an operation of a write back activator shown in FIG. 1.
Figure 6:
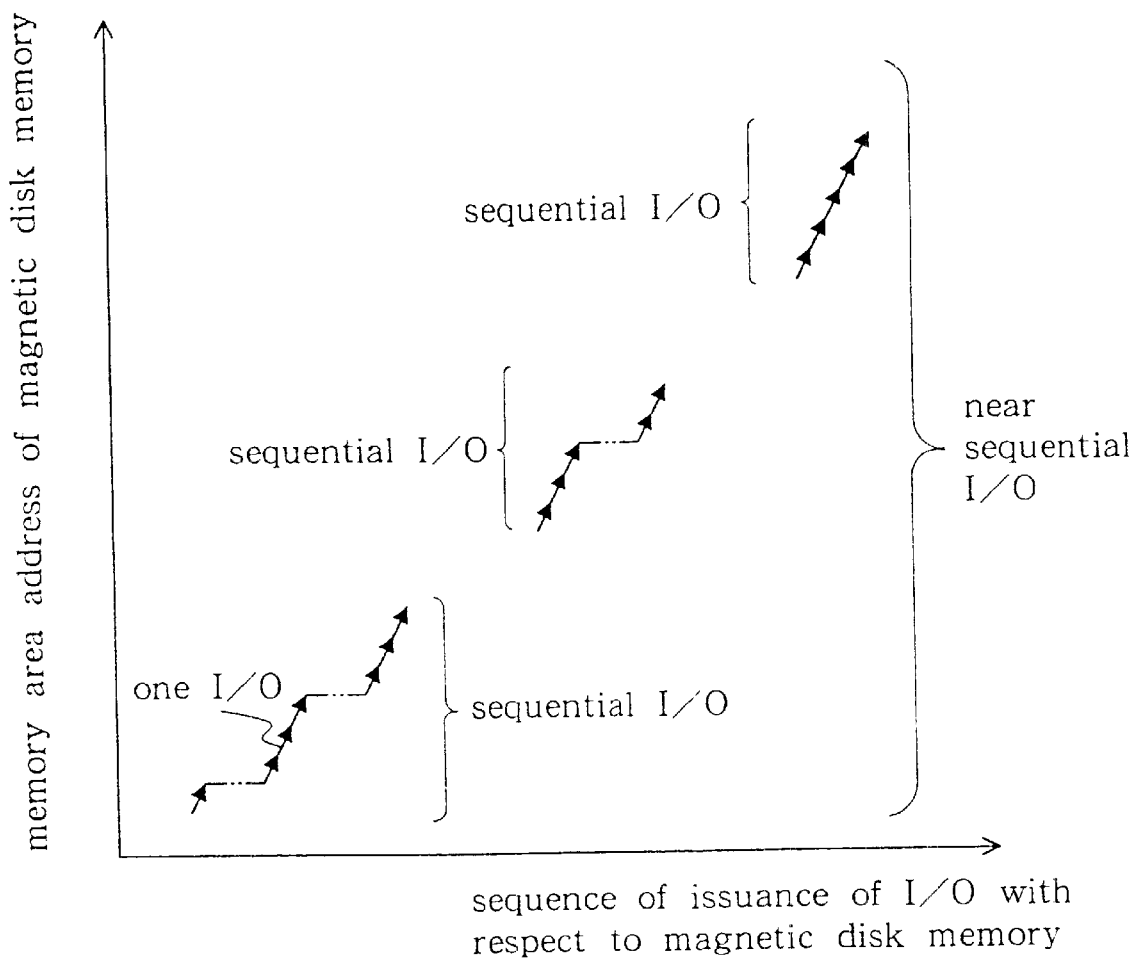
FIG. 6 is an access pattern of a near sequential I/O stream.

Referring to FIG. 5, a processing performed by the write back activator 13 comprises a write back start address calculation step S301, a write back activating step S302 and a write back size update step S303.

Now, an operation of the magnetic disk processor 1 according to this embodiment constructed as mentioned above will be described.

Every time an I/O stream arrives at the magnetic disk processor 1 from the host computer 2 (step S101), the magnetic disk processor 1 searches an entry which has [RIW type] coincident with "R/W type" assigned by the I/O stream and satisfies the following condition:

[entry key]≦start address of I/O stream≦[entry key]+α from the I/O stream monitor table 4 by the I/O stream monitor 11 (step S102).

When there is no such entry found (entry miss, NO in the step S103), the magnetic disk processor 1 newly adds the following entry to the I/O stream monitor table 4 by the I/O stream monitor 11 (step S104):

[entry key]="start address"+"size"

[stream start address]="start address"

[I/O stream size]="size"

[R/W type]="R/W type"

On the other hand, when there is such entry found (entry hit, YES in the step S103), the magnetic disk processor 1 updates [entry key] of the entry to "start address"+"size"

of that I/O stream by the I/O stream monitor 11 and, when it is determined as sequential I/O stream, makes

[I/O stream size]=[I/O stream size]+"size"

or determined as near sequential I/O stream, makes

[I/O stream size]=[I/O stream size]+(past [entry key]−"header address" of that I/O stream)+"size"

(step S105).

Then, the magnetic disk processor 1 determines whether or not [R/W type] is "read" by the I/O stream monitor 11 (step S106). If it is YES, then the magnetic disk processor 1 determines whether or not a difference between [prefetch size] and [I/O stream size] becomes smaller than a threshold value γ, that is, whether or not the amount of prefetched data becomes small by reading out thereof by the host computer I/O channel (step S107). When the difference becomes smaller than the threshold value γ, the prefetch activator 12 is called (step S108).

The prefetch activator 12 calculates a prefetch start address from [stream start address] and [prefetch size] (step S201) to newly activate a prefetch of a preset size (step S202) and update [prefetch size] (step S203).

If NO in the step S106, that is, when it is not read but write, the magnetic disk processor 1 causes the I/O stream monitor 11 to determine whether or not the difference between [I/O stream size] and [write back size] becomes larger than a preset threshold value d, that is, whether or not data which was received by the host computer I/O channel but not written back is accumulated (step S109). If YES, then the write back activator 13 is called (step S110).

The write back activator 13 calculates a write back start address from the [stream start address] and [write back size] (step S301), newly activates a write back of preliminarily set size (step S302) and updates [write back size] (step S303).

In order to avoid overflow of entry, the I/O stream monitor 11 deletes an entry which is considered as most unnecessary by, for example, performing LRU (Least Recently Used) control of entry in the I/O stream monitor table 4. That is, when the number of entries exceeds the upper value N, the entries are deleted starting from tat whose final update time is oldest, that is, the least recently used entry.

For I/O stream which is a sequential I/O stream accessing successive recording spaces sequentially, it becomes entry hit every time when I/O stream arrives at the magnetic disk processor 1 and the content of hit entry is updated. Depending upon the content of entry, it is possible to interpret I/O stream start address, accumulated access size and R/W type.

For I/O stream which is a random I/O stream randomly accessing recording spaces which are not successive, it becomes entry miss every time when I/O stream arrives at the magnetic disk processor 1 and a new entry is added. When the number of entries reaches the upper limit, the oldest entry which was not updated and left is deleted and the new entry is registered.

As a result of the above mentioned composite operation, entry related to I/O stream of sequential access type stays on the I/O stream monitor table 4 for a long time.

Further, for near sequential I/O stream accessing continuous or non-continuous recording spaces sequentially, which is recognized as random I/O stream randomly accessing non-continuous recording spaces and becomes entry miss, it is possible to improve an erroneous recognition that it becomes entry miss every time when an I/O stream arrives at the magnetic disk processor 1 and an I/O stream which is primarily to be recognized as one I/O stream is recognized as separate I/O streams and, therefore, it is possible to stay entry related to sequential access type I/O stream in the I/O stream monitor table for a long time.

As described, it becomes possible in a case where sequential I/O streams generated by the respective independent applications 6A~6D are mixed in the host computer 2 and arrive at the magnetic disk processor 1 as random I/O streams to detect the sequential I/O stream of the respective applications 6A~6D by searching and updating the I/O stream monitor table 4 composed of a plurality of entries.

The I/O stream monitor 11 for monitoring I/O streams from the host computer 2 searches and updates the I/O stream monitor table 4 for storing the information of I/O stream every time when an I/O stream arrives from the host computer 2. When a start address of a certain I/O stream coincides with (last address of a certain past I/O stream stored in the I/O stream monitor table 4)+1, the I/O stream monitor 11 decides that the certain I/O stream is a sequential I/O stream and, when it is within (the last address of the past I/O stream)+α, the I/O stream monitor 11 decides that the I/O stream is a near sequential I/O stream. When a sequential I/O stream or a near sequential I/O stream is detected, the I/O stream monitor 11 performs an optimization control, such as prefetch or write back, of the magnetic disk devices 9A~9C.

As described above, it becomes possible to detect sequential I/O streams issued from a plurality of independent applications and mixed on the input/output channel of the host computer by providing an I/O stream monitor table and by determining by I/O stream monitor means whether or not a start address of a certain I/O stream coincides with (last address of a certain past I/O stream stored on the I/O stream monitor table)+1 or whether or not the start address is within a range of (last address of the past I/O stream)+α.

Further, with the addition of [prefetch size] field for storing prefetched sizes to the entries of the I/O stream monitor table and the provision of the prefetch activator, it is possible to realize a prefetch operation optimal to I/O streams by calculating a prefetch start address from [stream start address] and [prefetch size] when a sequential read or near sequential read is detected by entry hit to a certain "read" type I/O stream and, as a result of the table operation, [R/W type] thereof is "read" and the difference between [prefetch size] and [I/O stream size] becomes smaller than a preset threshold value, that is, when the prefetched data is read out by the host computer and reduced considerably, newly activating a prefetch of a preset size and updating [prefetch size].

Further, with the addition of [write back size] field for storing written back sizes to the entries of the I/O stream monitor table and the provision of the write back activator, it is possible to realize a write back operation optimal to I/O streams by calculating a write back start address from [stream start address] and [write back size] when a sequential write or near sequential write is detected by entry hit to a certain "write" type I/O stream and, as a result of the table operation, [R/W type] thereof is "write" and the difference between [write back size] and [I/O stream size] becomes larger than a preset threshold value, that is, when data which was received by the host computer I/O but not written back and left as it is accumulated newly activating a write back of a preset size and updating [write back size].

What is claimed is:

1. A magnetic disk processing device, comprising:

an input/output stream monitor table for storing an information of input/output streams;

input/output stream monitor means for searching and updating said input/output stream monitor table when an input/output stream from a host computer arrives at said input/output monitor means and determining, on a basis of whether or not a start address of a certain input/output stream coincides with an incremented value of a last address of a past input/output stream stored in said input/output stream monitor table, whether or not the input/output stream is a sequential input/output stream to be read from or written into a magnetic disk; and prefetch activator means for calculating a start address of prefetch on the basis of the stream start address and the prefetch size when said input/output stream monitor means detects a sequential read by hitting an entry by an input/output stream of a certain read type and a difference between the prefetch size and the input/output stream size becomes smaller than a preset threshold value as a result of an operation of said input/output stream monitor table, newly activating the prefetch of a preset size and updating the prefetch size.

2. A magnetic disk processing device, comprising:

an input/output stream monitor table for storing an information of input/output streams;

input/output stream monitor means for searching and updating said input/output stream monitor table when an input/output stream from a host computer arrives at said input/output monitor means and determining, on a basis of whether or not a start address of a certain input/output stream coincides with an incremented value of a last address of a past input/output stream stored in said input/output stream monitor table, whether or not the input/output stream is a sequential input/output stream to be read from or written into a magnetic disk; and write back activator means for calculating a start address of write back on the basis of the stream start address and the write back size when said input/output stream monitor means detects a sequential write by hitting an entry by an input/output stream of a certain write type and a difference between the input/output stream size and the write back size becomes larger than a preset threshold value as a result of an operation of said input/output stream monitor table, newly activating the write back of a preset size and updating the write back size.

3. A magnetic disk processor, comprising:

an input/output stream monitor table for storing entry key, address of a start of a stream, input/output stream size, read/write type and prefetch size or write back size; and input/output stream monitor means for searching a re ad/write type and an entry of the entry key which coincide with a read/write type and a start address assigned by an input/output stream from said input/output stream monitor table every time when the input/output stream from a host computer arrives at said input/output stream monitor means, newly adding to said input/output monitor stream table an entry composed of:

entry key=start address+size, stream start address=start address, input/output stream size=size, and read/write=read/write type, when there is no coincident entry found, and updating, when there is coincident entry found, an entry key of the entry to a value of a sum of start address of new input/output and size to make:

new input/output stream size=input/output stream size+size and determining it as a sequential input/output stream.

4. A magnetic disk processor as claimed in claim 3, further comprising prefetch activator means for calculating a start address of prefetch on the basis of the stream start address and the prefetch size when said input/output stream monitor means detects a sequential read by hitting an entry by an input/output stream of a certain read type and a difference between the prefetch size and the input/output stream size becomes smaller than a preset threshold value as a result of an operation of said input/output stream monitor table, newly activating the prefetch of a preset size and updating the prefetch size.

5. A magnetic disk processor as claimed in claim 3, further comprising write back activator means for calculating a start address of write back on the basis of the stream start address and the write back size when said input/output stream monitor means detects a sequential write by hitting an entry by an input/output stream of a certain write type and a difference between the input/output stream size and the write back size becomes larger than a preset threshold value as a result of an operation of said input/output stream monitor table, newly activating the write back of a preset size and updating the write back size.

6. A magnetic disk processor, comprising:

an input/output stream monitor table for storing an information of input/output streams; and input/output stream monitor means for searching and updating said input/output stream monitor table when an input/output stream from a host computer arrives at said input/output monitor means and determining whether or not the input/output stream is a near-sequential input/output stream to be read from or written into a magnetic disk on a basis of whether or not a start address of a certain input/output stream coincides with a range from a last address of a past input/output stream stored in said input/output stream monitor table to said last address of the past input/output stream plus a desired value.

7. A magnetic disk processor as claimed in claim 6, further comprising prefetch activator means for calculating a prefetch start address from a stream start address and a prefetch size when said input/output stream monitor means detects a sequential read or near sequential read by hitting an entry by an input/output stream of a certain read type and a difference between the prefetch size and the input/output stream size becomes smaller than a preset threshold value as a result of an operation of said input/output stream monitor table, newly activating a prefetch of a preset size and updating the prefetch size.

8. A magnetic disk processor as claimed in claim 6, further comprising write back activator means for calculating a write back start address from a stream start address and a write back size when said input/output stream monitor means detects a sequential read or near sequential read by hitting an entry by an input/output stream of a certain write type and a difference between the prefetch size and the input/output stream size becomes larger than a preset threshold value as a result of an operation of said input/output stream monitor table, newly activating a write back of a preset size and updating the write back size.

9. A magnetic disk processor comprising:

an input/output stream monitor table for storing an entry key, stream start address, an input/output strewn size, a read/write type and prefetch size or write back size; and input/output stream monitor means for searching an entry having a read/write type coincident with that assigned by an input/output stream and a start address of the input/output stream within a range from an entry key to "entry key+α" from said input/output stream monitor table every time when the input/output stream from a host computer arrives at said input/output stream monitor means, newly adding to said input/output stream monitor table an entry composed of:
entry key=start address+size,
stream start address=start address,
input/output stream size=size, and
read/write type=read/write type when there is no coincident entry found, and updating, when there is coincident entry found, an entry key of the entry to:
new input/output stream size=input/output stream size+size and determining it as a sequential input/output stream or a near sequential input/output stream.

10. A magnetic disk processor as claimed in claim 9, further comprising prefetch activator means for updating the prefetch size by newly activating a prefetch of a size preliminarily set by calculating a prefetch start address on the basis of a stream start address and the prefetch size, when said input/output stream monitor means detects a sequential read or a near sequential read by an entry hitting a certain input/output stream of a certain read type and a difference between prefetch size and an input/output stream size becomes smaller than a preset threshold value as a result of an operation of said input/output stream monitor table.

11. A magnetic disk processor as claimed in claim 9, further comprising write back activator means for updating the write back size by newly activating a write back of a size preliminarily set by calculating a write back start address on the basis of a stream start address and the write back size, when said input/output stream monitor means detects a sequential write or a near sequential write by an entry hitting an input/output stream of a certain read type and a difference between write back size and an input/output stream size becomes larger than a preset threshold value as a result of an operation of said input/output stream monitor table.

12. A method for detecting a data stream, comprising:

storing information of input/output streams in a table;

searching and updating said table when an input/output stream arrives from a host computer; and determining whether or not the input/output stream is a near-sequential input/output stream on a basis of whether or not a start address of a certain input/output stream is within a range from a last address of a certain past input/output stream in said table to said last address of the past input/output stream plus a desired value.

13. A method for controlling data read from and written to a magnetic disk, comprising:

storing information in a table, said table including an entry key, address of a start of a stream, input/output stream size, read/write type and pre-fetch size or write back size;

searching a read/write type and an entry of the entry key which coincides with a read/write type and a start address assigned by an input/output stream from said table when the input/output stream from a host computer arrives;

newly adding to said table an entry composed of
entry key=start address+size,
stream start address=start address,
input/output stream size=size; and
read/write=read/write type, when there is no coincident entry found, and updating, when there is coincident entry found, an entry key to a value of a sum of start address of input/output and size to make:
input/output stream size=input/output stream size+size, and determining it as a sequential input/output stream.

* * * * *